United States Patent [19]

Sagara

[11] 4,179,300

[45] Dec. 18, 1979

[54] OPTICAL GLASS

[75] Inventor: Hiroji Sagara, Akikawa, Japan

[73] Assignee: Hoya Corporation, Tokyo, Japan

[21] Appl. No.: 871,169

[22] Filed: Jan. 20, 1978

[30] Foreign Application Priority Data

Jan. 27, 1977 [JP] Japan ................................. 52-8096

[51] Int. Cl.$^2$ .............................................. C03C 3/10
[52] U.S. Cl. ................................. 106/47 Q; 106/52; 106/54
[58] Field of Search .......................... 106/47 Q, 52, 54

[56] References Cited

U.S. PATENT DOCUMENTS

| | | | |
|---|---|---|---|
| 2,523,266 | 9/1950 | Armistead | 106/54 |
| 2,699,399 | 1/1955 | Armistead | 106/54 |
| 3,902,910 | 9/1975 | Hares et al. | 106/47 Q |
| 4,084,978 | 4/1978 | Sagara | 106/54 |

OTHER PUBLICATIONS

Schott Catalog-portions of pp. 56-67, 74-79 and Diagram of Optical Glasses.

*Primary Examiner*—Helen M. McCarthy

*Attorney, Agent, or Firm*—Sughrue, Rothwell, Mion, Zinn and Macpeak

[57] ABSTRACT

An optical glass having a refractive index of 1.66 to 1.77 and an Abbe number of 30 to 50 and superior chemical stability, which comprises, in % by weight, 30 to 45% $SiO_2$;
0 to 6% $B_2O_3$;
1 to 5% $Li_2O$;
0 to 4% $Na_2O + K_2O$;
20 to 40% BaO;
5 to 20% MgO + CaO + SrO + ZnO,
with the proviso of
    0 to 15% MgO,
    0 to 20% CaO,
    0 to 20% SrO, and
    0 to 15% ZnO;
2 to 7% $ZrO_2$;
2 to 20% $TiO_2$; and
0 to 10% $La_2O_3 + Ta_2O_5 + Nb_2O_5 + WO_3$,
with the proviso of
    0 to 10% $La_2O_3$, and
    0 to 4% $Ta_2O_5 + Nb_2O_5 + WO_3$.

1 Claim, No Drawings

OPTICAL GLASS

BACKGROUND OF THE INVENTION

1. Field of the Invention

This invention relates to an optical glass having specific optical constants expressed by a refractive index (nd) of 1.66 to 1.77 and an Abbe number (νd) of 30 to 50.

2. Description of the Prior Art

A number of glasses having optical constants of a refractive index and an Abbe number within the ranges described above have been known for a long time. Many of them, however, contain a relatively large amount of PbO, or both PbO and $TiO_2$. PbO has the defect of poor chemical resistance. The copresence of PbO and $TiO_2$ has the defect of causing a strong coloration. Moreover, such glasses tend to undergo greater phase separation as the $TiO_2$ content increases. In order to avoid phase separation, relatively large amounts of $B_2O_3$ and $Al_2O_3$ must be used in the glass. Consequently, this causes a reduction in the amount of $SiO_2$, and sufficient chemical resistance cannot be obtained.

SUMMARY OF THE INVENTION

Extensive experiments now have been made and it has been found that the coloration of the glass can be reduced by using $TiO_2$ without PbO, and by adding a small amount of $Li_2O$ to prevent the tendency toward phase separation and by increasing the amount of $SiO_2$, a glass having a high degree of chemical resistance can be obtained. It has also been discovered that among the alkaline earth metal oxides, BaO has an especially large effect in preventing the tendency of the glass toward devitrification, and the increase in the BaO content does not deteriorate the chemical resistance of the glass.

Thus, an object of this invention is to provide an optical glass which consists essentially of an $SiO_2$-$Li_2O$-alkaline earth metal oxide-$TiO_2$-$ZrO_2$ glass, and which has reduced coloration, superior chemical resistance, high hardness facilitating polishing, and a meltability and resistance to devitrification that are suitable for mass production.

According to this invention, there is provided an optical glass comprising, in % by weight, 30 to 45% $SiO_2$,
0 to 6% $B_2O_3$,
1 to 5% $Li_2O$,
0 to 4% $Na_2O + K_2O$,
20 to 40% BaO,
5 to 20% MgO + CaO + SrO + ZnO,
with the proviso of
    0 to 15% MgO,
    0 to 20% CaO,
    0 to 20% SrO, and
    0 to 15% ZnO,
2 to 7% $ZrO_2$,
2 to 20% $TiO_2$, and
0 to 10% $La_2O_3 + Ta_2O_5 + Nb_2O_5 + WO_3$,
with the proviso of
    0 to 10% $La_2O_3$, and
    0 to 4% $Ta_2O_5 + Nb_2O_5 + WO_3$.

DETAILED DESCRIPTION OF THE INVENTION

The criticality of the specific amounts of the glass components set forth above is described below. All percents herein are by weight.

If the amount of $SiO_2$ is larger than 45%, the desired refractive index cannot be obtained, and if the amount of $SiO_2$ is below 30%, the chemical resistance of the glass is deteriorated.

$B_2O_3$ is a component which is effective for preventing devitrification of the glass. If the amount of $B_2O_3$ exceeds 6%, the chemical resistance of the glass is deteriorated.

$Li_2O$ is effective for preventing a tendency toward phase separation. If the amount of $Li_2O$ exceeds 5%, the chemical resistance of the glass is reduced.

$Na_2O$ and $K_2O$ are effective for preventing devitrification. If the total amount of these components exceeds 4%, the chemical resistance of the glass is reduced.

BaO does not serve to prevent devitrification of the glass if the amount of BaO is below 20% or above 40%.

MgO, CaO, SrO and ZnO serve to prevent devitrification of the glass, and must be present in a total amount of 5 to 20%. If the amounts of MgO, CaO, SrO and ZnO are more than 15%, 20%, 20% and 15%, respectively, and the total amount of these components exceeds 20%, the tendency of the glass to devitrify increases.

$ZrO_2$ serves to prevent devitrification of the glass and increases the chemical resistance and hardness of the glass. $ZrO_2$ must be present in an amount of at least 2%. If the amount of $ZrO_2$ exceeds 7%, the tendency toward devitrification of the glass is abruptly increased.

$TiO_2$ must be present in an amount of at least 2% in order to maintain a high refractive index and increase the chemical resistance of the glass. If the amount of $TiO_2$ exceeds 20%, the tendency to devitrification of the glass increases.

$La_2O_3$, $Ta_2O_5$, $Nb_2O_5$ and $WO_3$ are used principally for the purpose of controlling the optical constants of the glass. Since these materials are expensive, the amount of $La_2O_3$ is limited to not more than 10%, and the total amount of $Ta_2O_5$, $Nb_2O_5$ and $WO_3$ is limited to not more than 4%.

Examples of the glass of this invention and their properties are tabulated below. The composition of each glass is expressed in % by weight.

| Component | Example No. | | | | | | |
|---|---|---|---|---|---|---|---|
| | 1 | 2 | 3 | 4 | 5 | 6 | 7 |
| $SiO_2$ | 38.6 | 33.0 | 39.2 | 36.0 | 39.0 | 38.1 | 32.4 |
| $B_2O_3$ | 3.0 | 4.0 | 3.0 | 3.0 | 3.0 | — | 4.0 |
| $Li_2O$ | 2.0 | 2.0 | 2.0 | 2.0 | 2.0 | 3.0 | 2.0 |
| BaO | 22.1 | 27.4 | 33.4 | 31.4 | 28.0 | 23.4 | 31.0 |
| SrO | — | — | 6.0 | — | — | 9.0 | — |
| CaO | 12.7 | 5.9 | 6.9 | 3.0 | 9.0 | — | 4.0 |
| MgO | — | — | — | 4.0 | — | — | — |
| ZnO | 3.8 | 4.3 | — | 3.0 | 4.0 | 9.0 | 5.0 |
| $ZrO_2$ | 5.0 | 5.0 | 5.0 | 4.0 | 5.0 | 4.0 | 5.0 |
| $TiO_2$ | 9.8 | 18.4 | 4.5 | 11.6 | 10.0 | 12.5 | 10.4 |
| $Na_2O$ | 2.0 | — | — | — | — | — | — |

-continued

| Component | Example No. | | | | | | |
|---|---|---|---|---|---|---|---|
| | 1 | 2 | 3 | 4 | 5 | 6 | 7 |
| $K_2O$ | 1.0 | — | — | — | — | — | — |
| $La_2O_3$ | — | — | — | — | — | — | 6.2 |
| $Ta_2O_5$ | — | — | — | 1.0 | — | — | — |
| $Nb_2O_5$ | — | — | — | 1.0 | — | — | — |
| $WO_3$ | — | — | — | — | — | 1.0 | — |
| nd | 1.6891 | 1.7630 | 1.6667 | 1.7148 | 1.6982 | 1.7189 | 1.7289 |
| νd | 41.6 | 33.0 | 47.9 | 38.6 | 41.2 | 37.5 | 39.3 |
| Acid Resistance (%) | 0.1 | <0.1 | 0.1 | <0.1 | <0.1 | <0.1 | 0.1 |

The acid resistance of the glass is measured by "the method for measuring the chemical resistance of an optical glass (the powder method)" specified in the Standards of the Japan Association of the Optical Glass Industry. According to this method, a powdered sample is immersed for 1 hour in a 0.01N aqueous solution of nitric acid at 100° C., and the weight loss of the sample is expressed in % and made the acid resistance of the glass.

The optical glass of this invention and those in the Examples given hereinabove can be obtained by melting a mixture of materials, for example, silica powder, boric acid, lithium carbonate, sodium carbonate, potassium nitrate, barium carbonate, magnesium carbonate, calcium carbonate, strontium nitrate, zinc oxide, zirconium oxide, titanium oxide, lanthanum oxide, tantalum oxide, niobium oxide and tungsten oxide in a platinum crucible at about 1,300° to about 1,400° C., stirring the mixture to homogenize the mixture and remove bubbles, casting the molten mixture into a mold pre-heated at a suitable temperature, and annealing the product.

While the invention has been described in detail and with reference to specific embodiments thereof, it will be apparent to one skilled in the art that various changes and modifications can be made therein without departing from the spirit and the scope thereof.

What is claimed is:

1. An optical glass not containing PbO and consisting essentially of, in percent by weight, about 33.0% $SiO_2$, about 4.0% $B_2O_3$, about 2.0% $Li_2O$, about 27.4% BaO, about 5.9% CaO, about 4.3% ZnO, about 5.0% $ZrO_2$, and about 18.4% $TiO_2$ having a refractive index of about 1.7630, and Abbe number of about 33.0 and an acid resistance of less than 0.1%.

* * * * *